Jan. 13, 1953  M. MOSKOFF  2,625,188
SAW BLADE LUBRICATOR FOR HANDSAWS
Filed Nov. 17, 1948  2 SHEETS—SHEET 1
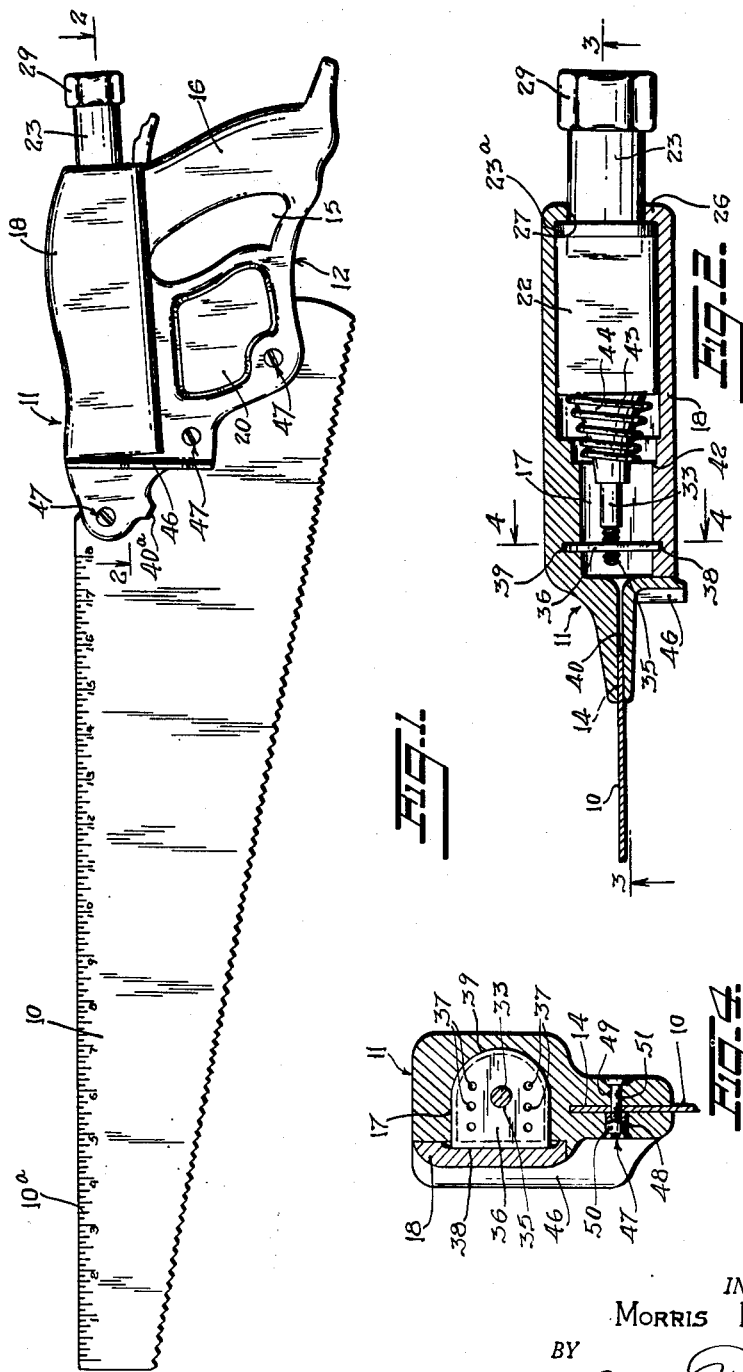
INVENTOR.
MORRIS MOSKOFF
BY
ATTORNEY

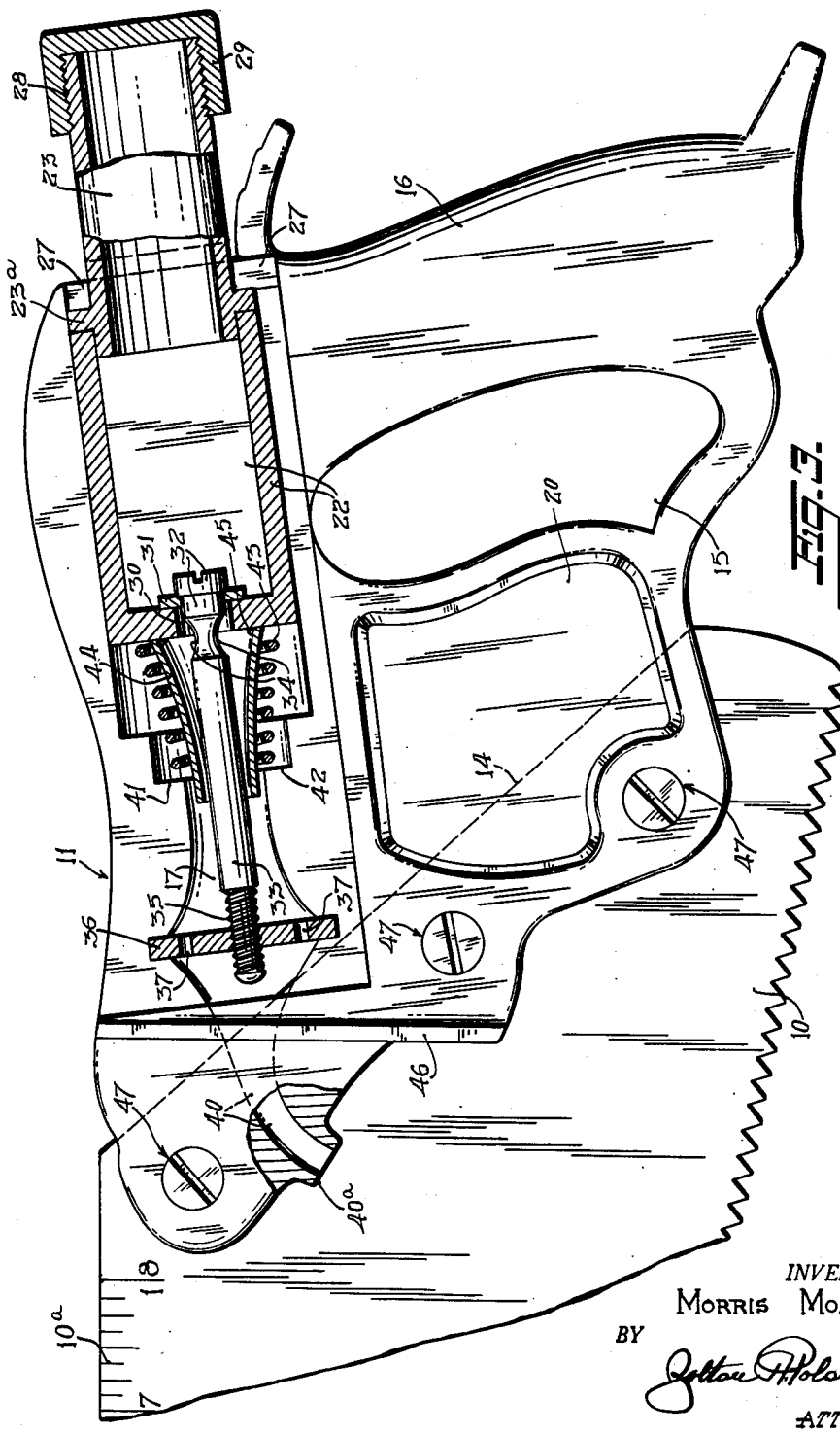

Patented Jan. 13, 1953

2,625,188

UNITED STATES PATENT OFFICE 2,625,188

SAW BLADE LUBRICATOR FOR HANDSAWS

Morris Moskoff, New York, N. Y.

Application November 17, 1948, Serial No. 60,507

4 Claims. (Cl. 145—35)

This invention relates to new and useful improvements in hand saws such as used by carpenters and the like, and, more particularly, the aim is to provide a novel and valuable means carried by the saw handle interiorly thereof, said means incorporating a reservoir for a lubricant for the saw blade and being readily manually operable to discharge a desired amount of the lubricant in a manner to cause it to spread over both sides of the saw blade.

A feature of the invention is the association with the reservoir of a valve means for normally holding the lubricant in the reservoir, said valve means normally held closed by a yielding means as a spring, and a manual actuator conveniently operable each time the lubricant is to be supplied to the saw blade; this actuator preferably in the form of a plunger projected at the upper rear portion of the saw handle and held normally projected by said yielding means.

Another feature of the invention is an arrangement whereby adjustability of the tension of such spring may be readily effected and by way of access thereto through said plunger.

A further feature of the invention is an arrangement whereby replenishment of the lubricant in the reservoir may be readily effected, and by way of a passage through said plunger, as by removing a screw cap on the outer end thereof; with said plunger tubular in nature and with its interior always in open communication with the interior of the reservoir, and with the plunger fixed to the reservoir for movement of these two parts as one unit.

Still another feature of the invention is an arrangement of the parts such that, with the new lubrication means nevertheless present, the hand saw may be expeditiously used as a try-square and/or as a measuring scale.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevational view of a hand saw equipped with the means of the invention and in accordance with a now favored embodiment.

Fig. 2 is a horizontal section, taken on the line 2—2 of Fig. 1.

Fig. 3 is an enlarged vertical section, taken on the line 3—3 of Fig. 2.

Fig. 4 is a transverse vertical section, taken on the line 4—4 of Fig. 2.

Referring to the drawings more in detail, a saw blade 10 is provided with a handle structure 11 having as its conventional elements a generally flattened lower subdivision 12, with the latter split at its forward portion by a slot 14 for receiving the butt end of the blade 10 preparatory to securing the blade to the handle structure; said subdivision 12 also having a hand-hold opening 15 and in rear of the latter a grip 16.

The saw blade 10 has its upper edge calibrated at 10ª to represent inch divisions or any other linear measurement.

The handle structure 11, however, is laterally enlarged along its upper portion and there hollowed out to establish a chamber 17; which chamber, wholly desirably carried within the handle structure 11, is closed at one side by a plate 18 which is secured to the handle structure 11 by any suitable acetone adhesive. This plate, and the remainder of the handle structure, is preferably made of a light plastic material and the handle's lower subdivision 12, in rear of the slot 14, may be on opposite sides provided with lightening recesses such as the one indicated at 20, which is hollow concave at one side and convex at the other side to receive the thumb and forefinger of the user, respectively.

The lubricant reservoir is a hollow body 22, of square cross-section. It is connected to a rearwardly extending cylindrical portion constituting the plunger 23 with a flange 23ª. The plunger 23 projects rearwardly from the chamber 17 through a circular opening, one-half of the periphery of which, this marked 24 in Fig. 2, is formed in the handle structure's main portion, and the other half of which periphery, this marked 25 in Fig. 2, is formed on an end extension 26 perpendicularly offset from the plate 18; which extension is shaped to fit snugly in a flat-bottomed recess 27 (Figs. 2 and 3) in the handle structure's main portion.

The rear end of the plunger 23 has an external thread 28, matching an internal thread in a screw-cap 29.

The front wall of the reservoir 22 has centrally thereof a valve opening 30, normally closed by a valve member in the form of a washer 31 on a screw 32 having a long cylindrical shank 33, which latter, adjacent to the opening 30, has cut-outs as at 34 at opposite sides thereof. Said screw 32 is threaded as at 35 at its forward end, for spiral engagement with a tapped hole through a plate 36.

Said plate 36 is provided with a suitable number of lubricant distribution orifices 37, shown as in upper and lower groups of three each. The plate 36 is held in place across the chamber 17 in any suitable way, but as herein illustrated it has one straight vertical side thereof seated in a groove 38 milled transversely of the plate 18 at the inner side thereof; the remainder of the outline of said plate being shown as semi-circular at its side opposite to its said straight vertical side and as having horizontal top and bottom portions in smooth continuation of the ends of such semi-circle, thereby to render it easy to employ simple milling operations relative to the chamber 17 to provide a groove 39 for seating the major portion of the perimeter of the plate 36 marginally thereof. However, any other shaped groove may be used.

From a point located forward of the plate 36 the chamber 17 is continued as a vertically widened and horizontally constricted channel 40, this so placed relative to the slot 14 that with the saw blade 10 secured in said slot the outer portion of said channel is split longitudinally thereof by the saw blade and so divided into two branch passages one leading to each side of the saw blade, at 40$^a$.

For facilitating easy casting of the main portion of the handle structure 11, the chamber 17, except in the path of longitudinal sliding of the reservoir 22, may be of a cross-section corresponding to that indicated in Fig. 4, but with the same stepped at top and bottom as best shown in Fig. 3 to provide arcuately extending top and bottom shoulders 41 and 42. These shoulders provide seating abutments for the forward end of an expansile coil spring 43, said spring sleeving a conical spout member 44 extending forwardly from the reservoir 22, and having its rear end abutting the forward end of the reservoir. As indicated, the spring 43 may be conical. The larger rear end of the spout member 44 is centered about the opening 30, and may be welded or otherwise secured to the reservoir as indicated at 45.

Whenever lubricant is desired for the saw blade, the plunger 23, with the saw so held that the saw blade is downwardly inclined from the handle, is pushed inward, merely one stroke; thereby uncovering the valve opening 30, and so allowing a portion of the lubricant to pass through said opening, then through the spout 44 and the orifices 37 into the channel 40, and, on reaching the portion of the saw blade in the slot 14, to become subdivided for flow onto the opposite sides of the saw blade. Also, even with the saw blade extended horizontally, a "shot" of the lubricant may be forcibly ejected through the valve opening 30, by pushing the plunger 23 inward, and abruptly releasing the same; thereby to permit the spring 43 to return the reservoir 22 to its normal extended position, and so cause the portion of the lubricant ejected to be derived from an annular column thereof lying ahead of the washer 31.

For replenishing the supply of lubricant in the reservoir 22, it is merely necessary to unscrew and remove the cap 29. Also, on removal of such cap, a screw driver may be inserted for engaging the head of the screw 32, thereby to tension or modify the tension of the spring 43 as desired, also for replacing the washer if necessary.

It will be noted that the main portion of the handle structure 11 has offset therefrom a rib 46. The forward side of said rib is plane and perpendicular to the flat of the saw blade, and said rib's forward side is also extended in a direction perpendicular to the top edge of the saw blade when the latter is secured in the slot 14; with the result that the saw may also be used as a try-square—and at the same time as a measuring scale, by virtue of the calibrations extended along a side of the saw blade adjacent to its top edge as indicated in Figs. 1 and 3.

The means herein disclosed for detachably anchoring the saw blade 10 in the slot 14 comprises three like screw assemblies 47. The structural characteristics of each of screw assemblies 47 is illustrated in Fig. 4. At each of the locations for one of the screw assemblies 47, along the length of the slot 14, aligned countersunk holes 48 and 49 are drilled through the two sides of the handle structure; with each pair of holes 48 and 49 also adapted to align with one of three apertures through the saw blade when the latter is properly set in the slot 14. The hole 48, for receiving a tubular screw 50 with an internal thread, is of larger diameter than the hole 49, as through this hole is sent the shank of a screw 51 externally threaded at its outer end portion to match the thread in the screw 50. The diameter of the unthreaded part of said shank is the same as the diameter of the apertures through the saw blade. The securing means just described gives a tight dependable mounting of the saw blade, without local projections at the heads of any of the elements 49 and 49; yet a saw blade with one type of cutting teeth may be readily substituted for another when desired.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:

1. Lubricating means for a saw having a blade and a handle at one end of the blade, comprising a lubricant reservoir carried by the handle means including a manual actuator for at will discharging a part of the lubricant from the reservoir onto blade, said handle along its upper portion having a chamber elongated substantially in the direction of length of the saw blade, said reservoir being slidably positioned in said chamber, yielding means urging said reservoir in one direction, said actuator being a plunger fixed at its forward end to the rear end of the reservoir and projected rearwardly from the handle, said plunger being hollow and with the inner end of its tubulation in open communication with the interior of the reservoir, a detachable means for closing the rear end of the plunger, and a manually adjustable means for modifying the action of said yielding means, said modifying means having an actuator projected into the reservoir and so located therein as to be engageable by a screw-driver or the like inserted through the plunger for effecting such adjustment.

2. Lubricating means for a saw having a blade and a handle at one end of the blade, comprising a lubricant reservoir carried by the handle means including a manual actuator for at will discharging a part of the lubricant from the reservoir onto the blade, said handle along its upper portion having a chamber elongated substantially in the direction of length of the saw blade, said reservoir being slidably positioned in said chamber, yielding means urging said reservoir in one direction, said actuator being a plunger fixed at its forward end to the rear end of the reservoir and projected rearwardly from the handle, said plunger being hollow and with the inner end of its tubulation in open communication with the interior of the reservoir, a detachable means for closing the rear end of the plunger, and a manually adjustable means for modifying the action of said yielding means, said modifying means having an actuator projected into the reservoir and so located therein as to be engageable by a screw-driver or the like inserted through the plunger for effecting such adjustment, valve means for controlling the flow of lubricant from said reservoir including a valve opening through the forward end of the reservoir and a valve member for closing said opening, means fixedly mounting said valve member including a screw the head of which is in the reservoir and the shank of which passes through said valve opening, the forward end of said shank being threaded, and a part fixed relative to the handle and internally threaded for engagement there with the first-named thread, said screw head being the last-named actuator.

3. Lubricating means for a saw having a blade and a handle at one end of the blade, comprising a lubricant reservoir carried by the handle, means including a manual actuator for at will discharging a part of the lubricant from the reservoir onto the blade, said handle along its upper portion having a chamber elongated substantially in the direction of length of the saw blade, said reservoir being slidably positioned in said chamber, yielding means urging said reservoir in one direction, said actuator being a plunger fixed at its forward end to the rear end of the reservoir and projected rearwardly from the handle, said plunger being hollow and with the inner end of its tubulation in open communication with the interior of the reservoir, a detachable means for closing the rear end of the plunger, and a manually adjustable means for modifying the action of said yielding means, said modifying means having an actuator projected into the reservoir and so located therein as to be engageable by a screw-driver or the like inserted through the plunger for effecting such adjustment, valve means for controlling the flow of lubricant from said reservoir including a valve opening through the forward end of the reservoir and a valve member for closing said opening, means fixedly mounting said valve member including a screw the head of which is in the reservoir and the shank of which passes through said valve opening, the forward end of said shank being threaded, and a part fixed relative to the handle and internally threaded for engagement there with the first-named thread, said screw head being the last-named actuator, said yielding means being a coil spring at its rear end abutted against the forward end of the reservoir and at its front end restrained against forward movement relative to the handle.

4. Lubricating means for a saw having a blade and a handle at one end of the blade, comprising a lubricant reservoir carried by the handle means including a manual actuator for at will discharging a part of the lubricant from the reservoir onto the blade, said handle along its upper portion having a chamber elongated substantially in the direction of length of the saw blade, said reservoir being slidably positioned in said chamber, yielding means urging said reservoir in one direction, said actuator being a plunger fixed at its forward end to the rear end of the reservoir and projected rearwardly from the handle, said plunger being hollow and with the inner end of its tubulation in open communication with the interior of the reservoir, a detachable means for closing the rear end of the plunger, and a manually adjustable means for modifying the action of said yielding means, said modifying means having an actuator projected into the reservoir and so located therein as to be engageable by a screw-driver or the like inserted through the plunger for effecting such adjustment, valve means for controlling the flow of lubricant from said reservoir including a valve opening through the forward end of the reservoir and a valve member for closing said opening, means fixedly mounting said valve member including a screw the head of which is in the reservoir and the shank of which passes through said valve opening, the forward end of said shank being threaded, and a part fixed relative to the handle and internally threaded for engagement there with the first-named thread, said screw head being the last-named actuator, said yielding means being a coil spring at its rear end abutted against the forward end of the reservoir and at its front end restrained against forward movement relative to the handle, said reservoir carrying beyond said valve opening a spout leading from the latter, said spring sleeving said spout.

MORRIS MOSKOFF.

REFERENCES CITED

The following references are of record in the file of this patent:

UNITED STATES PATENTS

| Number | Name | Date |
|---|---|---|
| 776,448 | Young | Nov. 29, 1904 |
| 1,256,434 | Bozzella | Feb. 12, 1918 |
| 1,450,884 | Eszto | Apr. 3, 1923 |
| 1,492,729 | Johnson | May 6, 1924 |
| 1,569,631 | Grogan | Jan. 12, 1926 |
| 2,164,238 | Gourley | June 27, 1939 |
| 2,206,730 | Pihlquist | July 2, 1940 |
| 2,250,444 | Brigham | July 29, 1941 |
| 2,354,379 | Johnson | July 25, 1944 |